(12) United States Patent
Evans

(10) Patent No.: US 7,347,154 B2
(45) Date of Patent: Mar. 25, 2008

(54) AMPHIBIOUS CRAFT

(75) Inventor: Mark Evans, Leamington Spa (GB)

(73) Assignee: Coupland Bell Limited, Warwickshire (GB)

( * ) Notice: Subject to any disclaimer, the term of this patent is extended or adjusted under 35 U.S.C. 154(b) by 0 days.

(21) Appl. No.: 10/868,162

(22) Filed: Jun. 14, 2004

(65) Prior Publication Data

US 2005/0016436 A1 Jan. 27, 2005

(30) Foreign Application Priority Data

Jun. 17, 2003 (GB) ................ 0313979.7

(51) Int. Cl.
*B63B 1/38* (2006.01)
*B60V 1/16* (2006.01)

(52) U.S. Cl. ............... 114/67 A; 114/271; 180/127

(58) Field of Classification Search ........... 244/110 B, 244/52, 101, 100 A; 180/116–130; 440/37; 114/67 A, 67 R, 271
See application file for complete search history.

(56) References Cited

U.S. PATENT DOCUMENTS

| | | | | |
|---|---|---|---|---|
| 3,379,270 A | * | 4/1968 | Hardy et al. | 180/127 |
| 3,389,672 A | | 6/1968 | Winter | |
| 3,399,655 A | | 9/1968 | Hunt | |
| 3,476,069 A | * | 11/1969 | Mantle et al. | 114/67 R |
| 3,481,297 A | * | 12/1969 | Mantle | 114/67 A |
| 3,515,236 A | * | 6/1970 | Weiland | 180/117 |
| 3,677,213 A | * | 7/1972 | Ford | 114/67 A |
| 4,131,175 A | | 12/1978 | Wheeler | |
| 4,397,367 A | * | 8/1983 | Ivanov et al. | 180/117 |
| 4,535,712 A | | 8/1985 | Matthews | |
| 5,005,660 A | * | 4/1991 | Yoshida et al. | 180/117 |
| 5,228,407 A | | 7/1993 | Cummer et al. | |
| 5,642,685 A | | 7/1997 | Garnier | |
| 5,746,146 A | * | 5/1998 | Bixel, Jr. | 114/67 A |

FOREIGN PATENT DOCUMENTS

| | | |
|---|---|---|
| CA | 2164101 | 11/1995 |
| CA | 2164010 | 5/1997 |
| EP | 0743239 | 11/2006 |
| GB | 1106753 | 3/1968 |
| GB | 1494733 | 12/1977 |
| GB | 2134857 | 8/1984 |
| JP | 401215692 | * 8/1989 |
| JP | 04191163 | 7/1992 |
| SE | 426043 | 12/1982 |
| WO | WO 00/01565 | 1/2000 |

* cited by examiner

*Primary Examiner*—Ed Swinehart
(74) *Attorney, Agent, or Firm*—SoCal IP Law Group LLP; Douglas N. Larson

(57) ABSTRACT

The present invention relates to an improved amphibious craft or vehicle and, in particular, but not exclusively, to a craft or vehicle that may be used for commercial and rescue tasks in a great variety of weather conditions. To achieve this, an amphibious vehicle comprises a fixed geometry planing hull (2) and a skirt system (4). This has as an advantage that the fixed geometry planing hull (2) allows the craft or vehicle to operate in high waves, strong winds or other adverse conditions too severe for known hovercraft of a similar size, while the skirt system (4) contains a cushion of air providing the craft or vehicle with a full amphibious capability so that the craft can operate as a conventional hovercraft in good conditions or enter and leave water in any conditions.

2 Claims, 3 Drawing Sheets

AMPHIBIOUS CRAFT

FIELD OF THE INVENTION

The present invention relates to an improved amphibious craft or vehicle and, in particular, but not exclusively, to a craft or vehicle that may be used for commercial and rescue tasks in a great variety of weather conditions. An amphibious craft or vehicle for the purposes of the present invention is one that is designed for operation on or from both water and land.

BACKGROUND TO THE INVENTION

Planing boats are widely operated in a variety of water and weather conditions. A planing hull is a hull designed to climb toward the surface of the water as power is supplied, thus reducing the friction or drag and therefore increasing hull speed. In other words a planing hull can rise bodily in the water and ride over the wave created by its progress through the water. The weight of a planing hull is supported by hydrodynamic lift and it does not displace an equal weight of water.

Planing boats with rigid "deep V" hulls and inflatable collars provide a robust and potentially fast craft. A "deep V" hull is able to plane at speed, while slicing through waves, minimising slamming at the bow. However, a slipway or hard surface is required for launching such a craft. Also, it is very difficult and potentially dangerous to launch such a craft in high waves or strong winds. Such craft are unable to cross exposed sand or mud banks, may be impeded in fouled water, or may strike submerged objects in flood water. In addition, conventional marine engines rely on water cooling. The water intakes of such conventional marine engines commonly become blocked in fouled or flood water, reducing engine reliability and compromising speed of response and safety of the craft to which they are fitted.

Known small hovercraft can be fully amphibious and are be able to cross-exposed sand or mud banks. They are immune to the problems in fouled water, -or flood water noted above. Conventional hovercraft engines rely on air cooling (for example, engines may be direct air cooled, or liquid-cooled with an air radiator) and are not compromised in fouled or flood water. Small hovercraft have hulls designed to ride over a surface on an air cushion. However, if the height of waves or obstructions is similar or greater than the height of the air cushion, such hovercraft cease to operate correctly and instead become displacement craft. A displacement craft is one having a hull that plows through the water displacing a weight of water equal to its own weight even when more power is added. As a displacement craft moves through water, the water is parted at the bow and closes in again at the stern.

The hull shapes of known hovercraft are not suited for use by a displacement craft. While such hull shapes do work, the hovercraft bounce and slam dangerously in waves. Similarly, thrust from air expelled at the back of the craft is not suited for use as a means for propelling a displacement craft. Again, such thrust works but provides poor acceleration and/or control. This means that such hovercraft can only operate in good weather conditions. Also, small hovercraft are also vulnerable to strong winds, or gusts, because they have very little friction with the surface, and so may be blown off course quite readily. Craft that do not alter the direction that the thrust air is expelled can have poor maneuverability, because controls in the air stream provide a turning moment on the body of the craft, but the course of the craft alters only as the craft loses momentum in an original direction through friction with the surface.

Moreover, hovercraft that are small enough to be transported by road without dismantling either have small rigid hulls, which limit their load-carrying capacity, or have a "loop and segment" skirt system which extends the lift cushion to a greater width around the hull. However, conventional "loop and segment" skirt systems have a large bag (loop) that collapses when lift air is turned off. The collapsed bag then impedes rapid loading on to a trailer. Some hovercraft have thrust reversers which provide a braking force. However, it can be extremely difficult to steer the craft while operating the reverse thrust.

It has previously been proposed (U.S. Pat. No. 3,389,672) to provide a displacement hulled vessel capable of operating as a gaseous cushion borne craft. However, such a vehicle would suffer in use from the slamming at the bow noted above or from limited speed associated with the displacement hull.

U.S. Pat. No. 4,535,712 shows a vessel having a variable geometry hull capable also of operating on the air cushion principle. This presents the problem that the geometry of the hull must be altered before the vehicle can change its mode of operation.

It is an advantage of the present invention that it eliminates or at least substantially reduces the problems noted above, while maintaining the benefits of the different craft considered.

BRIEF SUMMARY OF THE INVENTION

According to a first aspect of the present invention, an amphibious vehicle comprises a fixed geometry planing hull and a skirt system.

This has as an advantage that the fixed geometry planing hull allows the craft or vehicle to operate in high waves, strong winds or other adverse conditions too severe for known hovercraft of a similar size, while the skirt system contains a cushion of air providing the craft or vehicle with a full amphibious capability so that the craft can operate as a conventional hovercraft in good conditions or enter and leave water in any conditions. A full amphibious capability should be understood to mean that the craft or vehicle is able to support all of its weight by cushion pressure in order to travel as far as is required in this manner.

Additionally no manual conversion is required as between the modes of operation to alter the mode of operation of the vehicle. This should be understood to distinguish the present invention from those craft where the sides are physically assembled and bolted on after being transported in separate pieces.

Preferably, the skirt system is retractable.

Preferably, the skirt system comprises a plurality of side wings each pivotally connected at a first end to the hull of the craft, at least one collar connected to a second end of each of the side wings, a plurality of skirt segments supported from the at least one collar and a lift duct.

More preferably, the lift duct comprises a flexible membrane extending between the at least one collar and the hull.

Preferably, the at least one collar is inflatable.

Preferably, the vehicle comprises at least one fan duct adapted to contain a rudder or thrust reverser. Alternatively, the vehicle comprises at least one rudder adapted to operate as a thrust reverser.

Preferably, the or each fan duct comprises a propelling nozzle at an outlet and further comprises a plurality of apertures in side walls of the or each fan duct and vertical turning vanes associated with the plurality of apertures.

More preferably, the or each rudder comprises a plurality of vertical control surfaces located between fan means and the or an outlet of a fan duct.

More preferably, the or each rudder is arranged to direct air into or to block the apertures and associated vanes.

This has as an advantage that the or each rudder may be used to block the apertures and associated vanes to provide steering at the same time as reverse thrust.

Preferably, a single throttle lever controls a or the thrust reverser, an engine throttle and a gear box.

BRIEF DESCRIPTION OF THE DRAWINGS

The invention will now be described, by way of example only, with reference to and as illustrated in the accompanying drawings, in which.

DETAILED DESCRIPTION OF THE INVENTION

Figure 1:
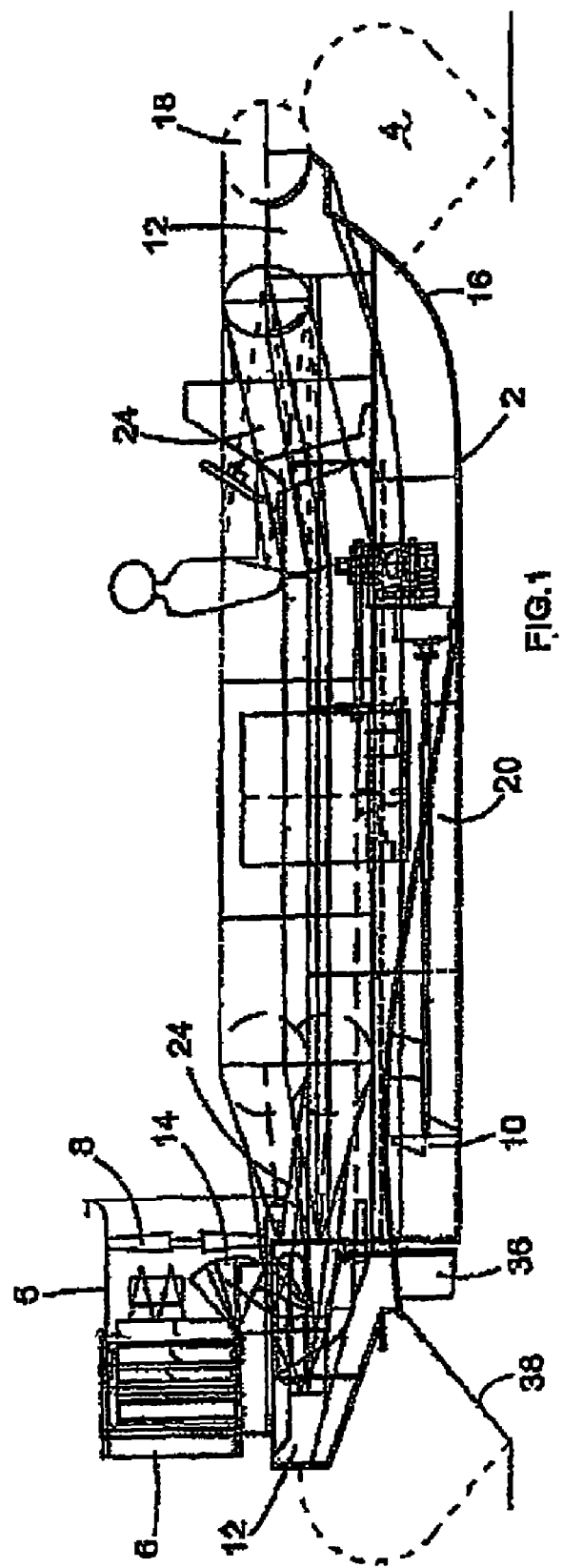
FIG. 1 illustrates in side section a side view of a craft in accordance with the present invention in which the wings are illustrated in both an extended and retracted position.

Referring first to FIG. 1, an amphibious craft in accordance with the present invention is provided with a fixed geometry planing hull 2 and a skirt system 4. The fixed geometry planing hull 2 allows the craft to operate in high waves, strong winds, or other conditions too severe for a conventional hovercraft of a similar size. The skirt system 4 contains a cushion of air, providing the craft with a full amphibious capability, so that the craft can operate as a conventional hovercraft in good conditions, or to enter and leave the water in any conditions. No manual conversion is required for the craft to alter its mode of operation.

Thrust may be provided by any air or water propulsion system, or systems. These include air propellers, fans, air jets, water propellers and water jets. In the illustrated embodiment, thrust is provided by one or more fan ducts 5 each having at an exit a nozzle 6 formed by a reduction in cross-sectional area (to accelerate the expelled air), the nozzle 6 being fed with air by one or more air fans 8. Thrust may additionally be supplied by one or more water propellers or water jets 10.

Figure 4:
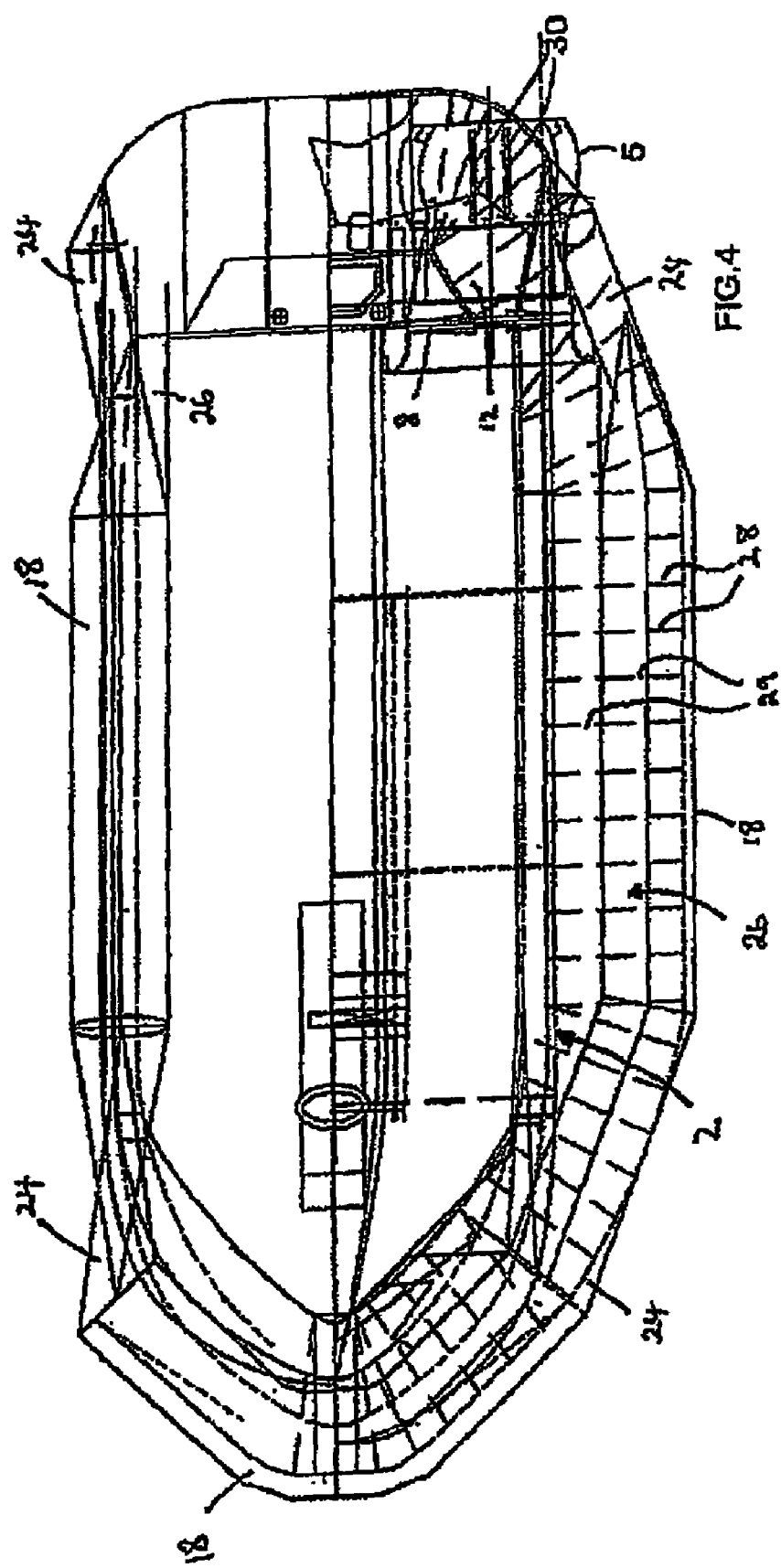
FIG. 4 illustrates in a plan view the craft of FIG. 1 showing to one side a side wing extended and to the other the side wing retracted.

Only one fan duct 5 is shown in FIG. 4 for clarity. In practice, the craft has a pair of fan ducts arranged side by side at the rear of the craft.

Figure 3:
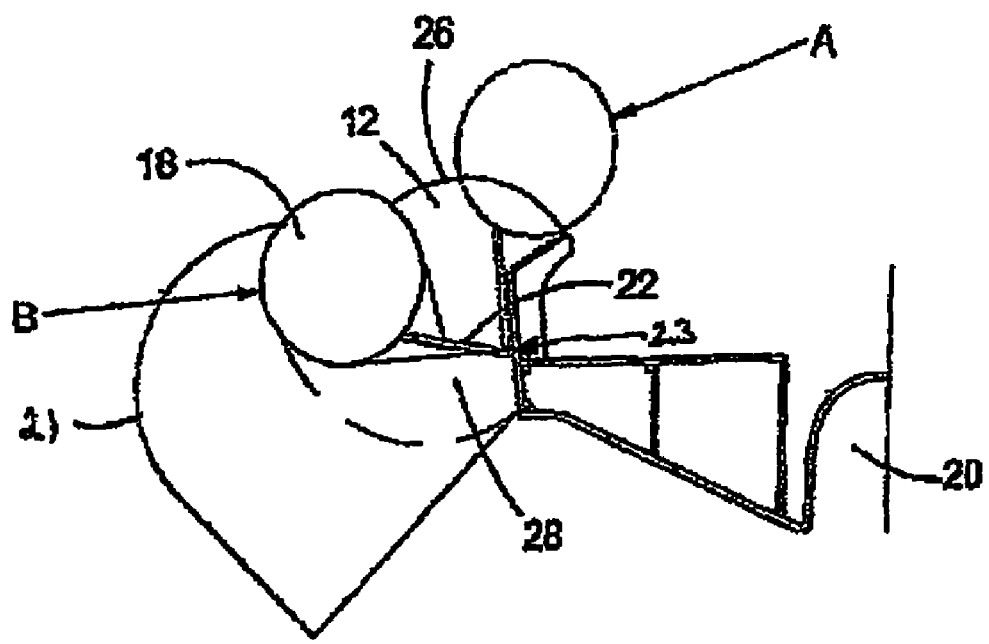
FIG. 3 illustrates in part section the hull and associated skirt system.

Lift may be provided by any means of supplying air or another gas to a containment device. In the illustrated embodiment, lift is provided by drawing a proportion of the air flow from ducted fans into a lift duct 12, from where the air flow is fed through the hull 2 to the skirt system 4. Splitter plates 14 are controlled to provide adequate lift air and may close to divert all of the air through the fan duct 5 to the thrust nozzle 6, while the craft is supported by the fixed geometry planing hull 2. The skirt system 4 may be rigid or flexible. In the illustrated embodiment, the skirt system consists of skirt segments 21 comprising open-ended flexible bags with a pocket sewn into each bag (FIG. 3). The skirt segments 21 may be formed from any suitable material. The skirt segments 21 are represented by the dashed lines in the lower part of FIG. 4.

The planing hull 2 may be a "deep V" design. In the illustrated embodiment, the hull 2 is a "deep V" design, with a bow 16 designed to slice through waves and push floating debris or ice to each side. The hull geometry is suitable to support the lower edges of the skirt segments 21 and at least one inflatable collar 18, so that the upper edges of the skirt segments 21 are supported from the inflatable collar(s) 18. A "tunnel" 20 in the hull bottom is formed behind the bow 16. A water propeller 10 is shown housed in the tunnel 20, so that the propeller 10 is above the bottom of the keel, or keels. In the illustrated embodiment, the bow 16 deflects floating debris or ice, so that clear water is fed to the propeller 10 in the tunnel 20, while the tunnel 20 protects the propeller 10 from damage when the craft dries out or is used over solid surfaces or submerged debris or obstructions.

The hull width is suitable for transport on a road trailer, or in a shipping container. Adequate width for the cushion of air is provided by side "wings" 22. The side skirt segments 21 are attached to the inflatable collar(s) 18 on the side wings 22 (FIG. 3). The inflatable collar(s) 18 may be separate or a single entity. In the illustrated embodiment, separate inflatable collars 18 are attached to the wings 22 and to the rigid part of the hull 2 around the bow 16, joined by envelopes 24 having sufficient flexibility for the side wings 22 to move through their full travel (the vertical component of this movement being shown in FIG. 1, and the horizontal component in FIG. 4). In FIG. 3 a wing 22 may be seen in a folded up position A and also a folded down position B. The connection between the wing 22 and the hull 2 is articulated at point 23 (FIG. 3). The wings 22 may be folded down to give maximum width for the cushion. The wings 22 may be folded up to give minimum width for transport out of the water. The skirt segments 21 may be pulled up out of the water by the action of the folding wings 22. In this way, hydrodynamic drag from the skirt segments 21 dragging in the water may be reduced, by lifting the skirt segments 21 clear of the water while the craft operates in its planing mode. Folding the wings 22 up also raises the inflatable collars 18 at the sides of the craft to their maximum height, which increases the freeboard and improves safety in poor weather conditions. In the illustrated embodiment, operation of the folding wings 22 is by an automatic control, allowing a rapid transition from planing to cushion operation without manual conversion. This allows the craft to enter high waves from a beach, mud flat or any other surface and then enter the planing mode of operation to proceed away safely. Similarly, the craft may leave disturbed water or high waves by driving at speed on to a beach, mud flat or any other surface and then enter the cushion mode of operation to proceed away safely.

The lift ducts 12 at the side of the craft may be collapsible, so that they occupy minimum space when the side wings 22 are folded up (shown in ghost in FIG. 3). In the illustrated embodiment, the lift ducts 12 are formed between the wings 22 and the sides of the hull 2, with a flexible membrane 26 to contain the air. When the wings 22 are in the folded up position, the membrane 26 is contained and does not impede rapid loading on to a trailer. Rapid deployment from a trailer is possible by folding down the wings 22 and using the air cushion to drive the craft directly off the trailer. In the illustrated embodiment, the skirt segments 21 have slits 29 (illustrated by the gaps in the dashed lines in FIG. 4) in their side walls 28. The slits 29 allow the segments 21 to be pulled clear of the water without tearing as the wings 22 fold up. When lift air flows into the skirt segments 21, the side walls 28 of the skirt segments 21 seal against each other to prevent loss of air. There is no difference in air pressure between adjacent skirt segments 21, so there is no flow of air out of the slits 29 in the side walls 28. In the illustrated embodiment, the top of each segment 21 is attached to the hull 2 or the inflatable collar 18 by a lip provided with a hook and loop fastening system. This allows damaged segments to be changed rapidly.

A set of drag flaps 38 at the stern of the craft are long enough to drag underneath the aft skirt segments (FIG. 1). The drag flaps 38 are buoyant, so that when the craft is floating or planing the drag flaps 38 lift the aft skirt segments clear of the water, to provide minimum drag.

Figure 2:
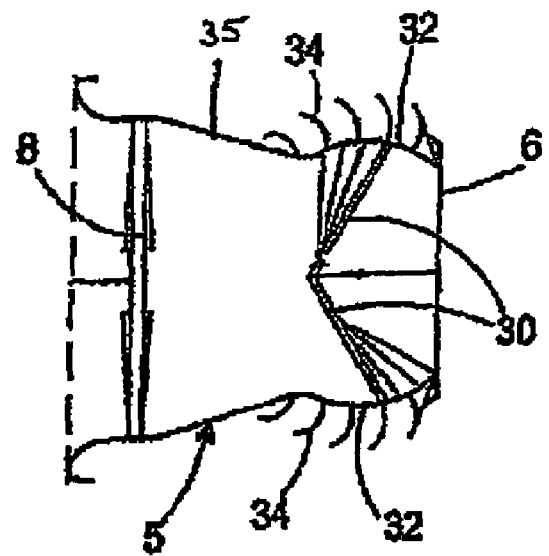
FIG. 2 illustrates a plan view of the air propulsion system.

The craft may conveniently be provided with one or more thrust reversers. The thrust reversers may be formed integral with the air rudders or separately. In the illustrated embodiment, a thrust reverser comprises a compound air rudder mounted in between the air fan 8 and the nozzle 6 of the fan duct 5. The compound rudder consists of two vertical control surfaces 30 mounted on a jockey bar. The control surfaces 30 are normally fixed parallel to each other and the jockey bar is rotated about a vertical axis to provide a turning moment at the rear of the craft. A separate control moves the control surfaces 30 relative to each other about vertical axes from the jockey bar, until their leading edges meet on a vertical line, so that the control surfaces 30 form a V in plan view (FIG. 2). This blocks the fan duct 5 and deflects the air flow from the fan 8 outwards towards side walls 35 of the fan duct 5. An aperture 32 in each side wall 35 has a number of vertical turning vanes 34, which deflect the air flow forwards. The reaction from the deflected air provides reverse thrust.

With the craft's steering in a neutral (straight-ahead) position, the reverse airflow is equal on both sides of the fan duct 5 and there is no turning moment on the rear of the craft. Moving the steering away from the neutral position rotates the rudder jockey bar, whether the control surfaces 30 have been locked parallel (FIG. 4) or moved to form a thrust reverser (FIG. 2). If the control surfaces 30 have been moved to form a thrust reverser, the outer edges of the V move across the side apertures 32, so that the open (un-blocked) area on one side is increased, while the open area on the other is decreased. The turning vanes 34 are at different angles, so that air emerging towards the back of the aperture exits at a greater angle to the craft axis than air emerging towards the front of the aperture. Thus, more air flow emerges on one side of the fan duct 5 than the other and the side with the greater flow also has more air directed sideways, so that the lateral reaction forces are unbalanced. This provides a turning moment at the rear of the craft, so that the craft can be steered while reverse thrust is operating.

Reverse thrust may be used to slow and stop the craft, or to reverse it. Effective steering while reversing allows the craft to be maneuvered easily. There is nothing to block the reverse flow apertures 32 or vanes 34, either when the control surfaces 30 are locked parallel, or in a V. When the control surfaces 30 are locked parallel and steering is neutral, little or no air escapes out of the apertures 32 because the air has sufficient momentum to get past the apertures 32. At forward speed, air from outside the fan duct 5 provides an additional sealing pressure. When the steering is moved away from neutral, some air is deflected by a vertical control surface 30 and out of one side of the fan duct 5. The reaction to this flow provides a powerful turning moment at the rear of the craft which, added to the reaction on the compound rudder, improves the maneuverability while the craft is stationary or traveling forwards, compared with a conventional craft.

The craft is also fitted with a pair of water rudders 36, which operate in a conventional manner.

Conventional boats may have a throttle box with a foward/reverse movement. Forward engages the gearbox forward gear before advancing the throttle cable. Reverse engages the gearbox reverse gear before advancing the throttle cable and the propeller turns in the opposite direction to pull the boat back or slow it down. This makes maneuvering the boat simple and quick.

Conventional hovercraft may have separate controls for throttle and thrust reverser(s), vectored thrust, elevons or skirt shifting mechanisms. These are effective but require a trained operator.

The amphibious craft of the present invention may have a single throttle lever that controls the thrust reverser, engine throttle and a gearbox. As the lever is moved forward from its neutral position, the vertical control surfaces 30 may be rotated until they are parallel to one another, forming a rudder assembly. The same movement of the lever advances the engine throttle once the vertical control surfaces 30 have moved. As the lever is moved backwards from its neutral position, the vertical control surfaces 30 may be rotated until they form a thrust reverser. The same movement of the lever advances the engine throttle once the control surfaces 30 have moved. The effect is that the craft can be moved forward, backward or slowed using the same control movement as a conventional boat throttle box. Operators of craft constructed in accordance with this aspect of the present invention will accordingly require little further training to use the system.

The amphibious craft of the present invention may have a water thrust system. This may be engaged or disengaged using the same control box. The box may have a separate lever, button or other control to do this, or it may have a separate movement of the single control lever. The control box may allow the lever to move in an H pattern in plan view. From the neutral position, the lever can be moved sideways to change from one side of the H to the other. The sideways movement may engage or disengage the water thrust system, so that forward/reverse movement on one side of the H has the water system engaged and on the other has the water system disengaged. The stops on the travel of the lever may be at different positions around the H, allowing the maximum engine power to be limited for different configurations. This system allows the operator to control the craft rapidly and easily, without using different controls for the various systems on the craft.

The steering system controls the compound air rudders and the water rudders simultaneously, so that steering is provided by a single control however the craft is operating.

I claim:

1. An amphibious vehicle, comprising:

a single planing hull of fixed geometry;

a skirt system attached to the planing hull;

the skirt system comprising first and second side wings each pivotally connected at a first end to the planing hull, and a plurality of skirt segments; and the skirt system being alternatively operable in a planing mode wherein the skirt system at the sides of the planing hull, when the vehicle is in the water, is located clear of the water and in a fully amphibious mode wherein the skirt system provides a cushion of air which supports the entire weight of the vehicle by cushion pressure;

wherein the skirt system further comprises at least one collar connected to a second end of each of the first and second side wings, and a plurality of skirt segments supported from the at least one collar and a lift duct; and wherein the lift duct at the sides of the vehicle is defined between the wing, the at least one collar and a flexible membrane extending between the at least one collar and the planing hull.

2. A vehicle according to claim 1 wherein the at least one collar is inflatable.

* * * * *